US009821792B2

(12) United States Patent
Morisaki

(10) Patent No.: US 9,821,792 B2
(45) Date of Patent: Nov. 21, 2017

(54) HYBRID VEHICLE

(71) Applicant: TOYOTA JIDOSHA KABUSHIKI KAISHA, Toyota-shi, Aichi-ken (JP)

(72) Inventor: Keisuke Morisaki, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/072,460

(22) Filed: Mar. 17, 2016

(65) Prior Publication Data
US 2016/0272190 A1 Sep. 22, 2016

(30) Foreign Application Priority Data

Mar. 19, 2015 (JP) ................. 2015-056056

(51) Int. Cl.
*B60W 20/13* (2016.01)
*B60W 50/08* (2012.01)
*B60W 10/06* (2006.01)
*B60W 10/08* (2006.01)
*B60W 20/00* (2016.01)
(Continued)

(52) U.S. Cl.
CPC ............ *B60W 20/13* (2016.01); *B60K 6/442* (2013.01); *B60W 10/06* (2013.01); *B60W 10/08* (2013.01); *B60W 20/00* (2013.01); *B60W 20/12* (2016.01); *B60W 20/20* (2013.01); *B60W 50/082* (2013.01); *B60W 2510/244* (2013.01); *B60W 2540/10* (2013.01); *B60Y 2200/92* (2013.01); *B60Y 2300/182* (2013.01); *B60Y 2300/43* (2013.01); *B60Y 2300/60* (2013.01); *B60Y 2300/91* (2013.01); *F02D 11/105* (2013.01); *Y02T 10/6286* (2013.01); *Y10S 903/93* (2013.01)

(58) Field of Classification Search
CPC ..................................... B60W 20/13
See application file for complete search history.

(56) References Cited

U.S. PATENT DOCUMENTS 9,014,891 B2* 4/2015 Takayanagi ............ B60K 6/445
180/65.265
9,415,698 B2* 8/2016 Sato ...................... B60L 3/0084
(Continued)

FOREIGN PATENT DOCUMENTS

EP   2 792 561 A1   10/2014
JP   2010-241396    10/2010

*Primary Examiner* — Adam Tissot
*Assistant Examiner* — Michael Berns
(74) *Attorney, Agent, or Firm* — Finnegan, Henderson, Farabow, Garrett & Dunner, LLP

(57) ABSTRACT

An ECU changes driving force characteristics in accordance with a changeover in mode, such that the vehicle driving torque for the same vehicle speed and the same accelerator opening degree becomes larger during a CD mode than during a CS mode. In changing the driving force characteristics in accordance with the changeover in mode, the ECU executes a slow change process such that the vehicle driving torque approaches a value after the changeover in mode from a value before the changeover in mode as time passes. In this slow change process, the speed of change in the vehicle driving torque in the slow change process is more strictly limited when the changeover in mode is made based on host vehicle position information than when the changeover in mode is made in accordance with the operation of a mode switch.

5 Claims, 11 Drawing Sheets

(51) Int. Cl.
*B60W 20/20* (2016.01)
*B60W 20/12* (2016.01)
*B60K 6/442* (2007.10)
*F02D 11/10* (2006.01)

(56) References Cited

U.S. PATENT DOCUMENTS

2013/0030634 A1\* 1/2013 Endo ........................ B60K 6/46
  701/22
2016/0272190 A1\* 9/2016 Morisaki ................ B60K 6/442

\* cited by examiner

HYBRID VEHICLE

CROSS-REFERENCE TO RELATED APPLICATION

This application is based upon and claims the benefit of priority from Japanese Patent Application No. 2015-056056 filed, on Mar. 19, 2015, which is incorporated herein by reference in its entirety.

TECHNICAL FIELD

This disclosure relates to a hybrid vehicle, and more particularly, to a hybrid vehicle that is equipped with an internal combustion engine, an electrical storage device, and an electric motor that is supplied with electric power from the electrical storage device to generate a running driving force.

BACKGROUND

Japanese Patent Application Publication No. 2010-241396 (JP 2010-241396 A) discloses a hybrid vehicle having a charge depleting (CD) mode and a charge sustaining (CS) mode. The CD mode is a mode in which the state of charge (the SOC) of an electrical storage device is positively consumed by mainly carrying out electric vehicle (EV) running although permitting hybrid vehicle (HV) running. The CS mode is a mode in which the SOC is controlled to a predetermined range by appropriately making a changeover between HV running and EV running. Incidentally, during EV running, the hybrid vehicle runs using only a motor-generator with an engine stopped. During HV running, the hybrid vehicle runs with the engine in operation.

With the hybrid vehicle described in Japanese Patent Application Publication No. 2010-241396 (JP 2010-241396 A), one of the CD mode and the CS mode is selected in accordance with host vehicle position information on the hybrid vehicle that is acquired by a navigation device, namely, a current position of the vehicle and a traveling direction of the vehicle.

SUMMARY

Due to recent progresses in power electronics technology, the performance of motors, inverters, electrical storage devices and the like has advanced. This technical development leads to a high degree of freedom in selecting a drive source (e.g., an engine and a motor) in a hybrid vehicle. In a hybrid vehicle having the CD mode and the CS mode, it has been desired to realize special running that provides improved performance to users in the CD mode.

Thus, with a view to realizing special running in the CD mode, it is conceivable to change the driving force characteristics of the vehicle between the CD mode and the CS mode. In concrete terms, it is conceivable to change the driving force characteristics between the CD mode and the CS mode such that the vehicle driving torque for the same vehicle speed and the same accelerator opening degree becomes larger when the CD mode is selected than when the CS mode is selected. Thus, the acceleration performance of EV running in the CD mode can be advanced (e.g., improved), and a strong feeling of acceleration can be obtained during EV running while increasing the number of opportunities for EV running in the CD mode.

However, in the configuration in which the running of the hybrid vehicle is controlled by selectively applying the CD mode and the CS mode based on the host vehicle position information as in the aforementioned Japanese Patent Application Publication No. 2010-241396 (JP 2010-241396 A), a changeover in mode between the CD mode and the CS mode is made in an aspect that is difficult for the user to perceive. Therefore, a change in the driving force characteristics resulting from a changeover in mode that is not intended by the user may cause a feeling of strangeness to the user.

In a hybrid vehicle to which a CD mode and a CS mode can be selectively applied based on host vehicle position information, disclosed embodiments may alleviate a feeling of strangeness that is caused to a user as a result of a changeover in mode between the CD mode and the CS mode, while realizing special running in the CD mode.

According to one aspect of the disclosure, a hybrid vehicle may be equipped with an internal combustion engine, an electrical storage device, an electric motor that is supplied with electric power from the electrical storage device to generate a running driving force, and a control device. The control device may select one of a CD mode and a CS mode, and may cause the hybrid vehicle to run while selecting one of a first running mode and a second running mode in accordance with a running situation in each of the CD mode and the CS mode. The first running mode may be a mode in which the hybrid vehicle runs using the electric motor with the internal combustion engine stopped. The second running mode may be a mode in which the hybrid vehicle runs with the internal combustion engine in operation. The hybrid vehicle may be further equipped with a communication device that is configured (e.g., programmed) to be able to acquire host vehicle position information on the vehicle. The control device may change driving force characteristics of the vehicle between the CD mode and the CS mode, such that a vehicle driving torque for a same vehicle speed and a same accelerator opening degree becomes larger when the CD mode is selected than when the CS mode is selected. Furthermore, in changing the driving force characteristics in accordance with a changeover in mode between the CD mode and the CS mode, the control device may change the vehicle driving torque from a value before the changeover in mode to a value after the changeover in mode over a longer time when the changeover in mode is made based on the host vehicle position information than when the changeover in mode is made in accordance with a selection made by a user or an SOC of the electrical storage device. Disclosed embodiments may also be described as follows. A hybrid vehicle may include an internal combustion engine, an electrical storage device, an electric motor that is supplied with electric power from the electrical storage device to generate a running driving force, a communication device that is configured to acquire host vehicle position information on the hybrid vehicle, and at least one electronic control unit. The electronic control unit may be configured (e.g., programmed) to select one of a charge depleting mode and a charge sustaining mode, and cause the hybrid vehicle to run while making a changeover between a first running mode and a second running mode in accordance with a running situation of the hybrid vehicle in each of the charge depleting mode and the charge sustaining mode. The first running mode is a mode in which the hybrid vehicle runs using the electric motor with the internal combustion engine stopped, and the second running mode is a mode in which the hybrid vehicle runs with the internal combustion engine in operation. The electronic control unit may be also configured to change driving force characteristics of the hybrid vehicle such that a driving torque of the hybrid vehicle for a same vehicle speed and a same accelerator opening degree at a time when the charge depleting mode is selected becomes larger than the driving torque for the same vehicle speed and the same accelerator opening degree at a time when the charge sustaining mode is selected, and change the driving force characteristics in accordance with a changeover in mode between the charge depleting mode and the charge sustaining mode, such that a time for a change from the driving torque before the changeover in mode to the driving torque after the changeover in mode at a time when the changeover in mode is made based on the host vehicle position information becomes longer than a time for a change from the driving torque before the changeover in mode to the driving torque after the changeover in mode at a time when the changeover in mode is made in accordance with a selection made by a user or a state of charge of the electrical storage device.

In at least some embodiments of a hybrid vehicle according to the above aspect, the acceleration performance of EV running in the CD mode may be advanced by changing the driving force characteristics of the vehicle in accordance with the changeover in mode between the CD mode and the CS mode as described above. Thus, a strong feeling of acceleration can be obtained during EV running in the CD mode.

It should be noted herein that the changeover in mode may be made in an aspect that is more difficult for the user to perceive when the changeover in mode is made based on the host vehicle position information than when the changeover in mode is made based on the selection made by the user or the SOC of the electrical storage device. Therefore, a change in the driving force characteristics resulting from the changeover in mode may cause a feeling of strangeness to the user. With the aforementioned hybrid vehicle, the speed of change in the vehicle driving torque may be more strictly limited when the changeover in mode is made based on the host vehicle position information than when the changeover in mode is made in accordance with the selection made by the user or the SOC of the electrical storage device. Thus, a feeling of strangeness that is caused to the user by a change in the driving torque resulting from a changeover in mode that is not intended by the user can be alleviated. As a result, special running in the CD mode can be realized, and a feeling of strangeness that is caused to the user as a result of its realization can be alleviated.

The control device may less strictly limit a speed of change in the vehicle driving torque (e.g., by decreasing a limit on a speed of change in the vehicle driving torque) when an amount of change in the vehicle driving torque is smaller than a predetermined value than when the amount of change is larger than the predetermined value, in changing the driving force characteristics in accordance with the changeover in mode based on the host vehicle position information.

In the case where the amount of change in the vehicle driving torque resulting from the changeover in mode is smaller than the predetermined value, even when the changeover in mode is automatically made based on the host vehicle position information, the user cannot feel much feeling of strangeness. Thus, the decrease in torque responsiveness resulting from the limitations on the speed of change in the vehicle driving torque can be held at a minimum necessary level by adopting the aforementioned configuration.

According to another aspect of the disclosure, a hybrid vehicle may be equipped with an internal combustion engine, an electrical storage device, an electric motor that is supplied with electric power from the electrical storage device to generate a running driving force, and a control device. The control device may select one of a CD mode and a CS mode, and cause the hybrid vehicle to run while selecting one of a first running mode and a second running mode in accordance with a running situation in each of the CD mode and the CS mode. The hybrid vehicle may be further equipped with a communication device that is configured to be able to acquire host vehicle position information on the vehicle. In making a changeover in mode between the CD mode and the CS mode in accordance with a selection made by a user or an SOC of the electrical storage device, the control device may change driving force characteristics of the vehicle in accordance with the changeover in mode. On the other hand, in making the changeover in mode based on the host vehicle position information, the control device may refrain from changing the driving force characteristics in accordance with the changeover in mode. Furthermore, in making the changeover in mode in accordance with the selection made by the user or the SOC of the electrical storage device, the control device may change the driving force characteristics such that a vehicle driving torque for a same vehicle speed and a same accelerator opening degree becomes larger when the CD mode is selected than when the CS mode is selected. Thus another aspect of the disclosure can also be defined as follows. A hybrid vehicle may include an internal combustion engine, an electrical storage device, an electric motor that is supplied with electric power from the electrical storage device to generate a running driving force, a communication device that is configured to acquire host vehicle position information on the hybrid vehicle, and at least one electronic control unit. The electronic control unit may be configured to select one of a charge depleting mode and a charge sustaining mode, and cause the hybrid vehicle to run while making a changeover between a first running mode and a second running mode in accordance with a running situation of the hybrid vehicle in each of the charge depleting mode and the charge sustaining mode. The first running mode may be a mode in which the hybrid vehicle runs using the electric motor with the internal combustion engine stopped, and the second running mode is a mode in which the hybrid vehicle runs with the internal combustion engine in operation. The electronic control unit may be also configured to change driving force characteristics of the hybrid vehicle in accordance with a changeover in mode between the charge depleting mode and the charge sustaining mode in making the changeover in mode in accordance with a selection made by a user or a state of charge of the electrical storage device, such that a driving torque of the hybrid vehicle for a same vehicle speed and a same accelerator opening degree at a time when the charge depleting mode is selected becomes larger than the driving torque for the same vehicle speed and the same accelerator opening degree at a time when the charge sustaining mode is selected, and refrain from changing the driving force characteristics in accordance with the changeover in mode, in making the changeover in mode based on the host vehicle position information.

In this hybrid vehicle, a strong feeling of acceleration can be obtained during EV running in the CD mode, by changing the driving force characteristics in accordance with the aforementioned changeover in mode. On the other hand, in the case where the changeover in mode between the CD mode and the CS mode is made based on the host vehicle position information, a feeling of strangeness that is caused to the user by a change in the driving torque resulting from a changeover in mode that is not intended by the user can be alleviated by refraining from changing the driving force characteristics in accordance with the changeover in mode. As a result, special running in the CD mode can be realized, and a feeling of strangeness that is caused to the user as a result of its realization can be alleviated.

The driving force characteristics at a time when one of the CD mode and the CS mode is selected based on the host vehicle position information are equivalent to the driving force characteristics at a time when the CD mode is selected in accordance with the selection made by the user or the SOC of the electrical storage device.

By adopting this configuration, a strong feeling of acceleration can be obtained during EV running in the CD mode even in the case where the driving force characteristics are not changed in accordance with the changeover in mode.

The hybrid vehicle is further equipped with a charging mechanism for charging the electrical storage device through use of electric power from an electric power supply outside the vehicle.

This hybrid vehicle can realize a strong feeling of acceleration during EV running while improving fuel economy in the CD mode through the use of the electric power supplied from the electric power supply outside the vehicle.

In the hybrid vehicle to which the CD mode and the CS mode can be selectively applied based on the host vehicle position information, disclosed embodiments may make it possible to alleviate a feeling of strangeness that is caused to the user as a result of a changeover in mode between the CD mode and the CS mode, while realizing special running in the CD mode.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
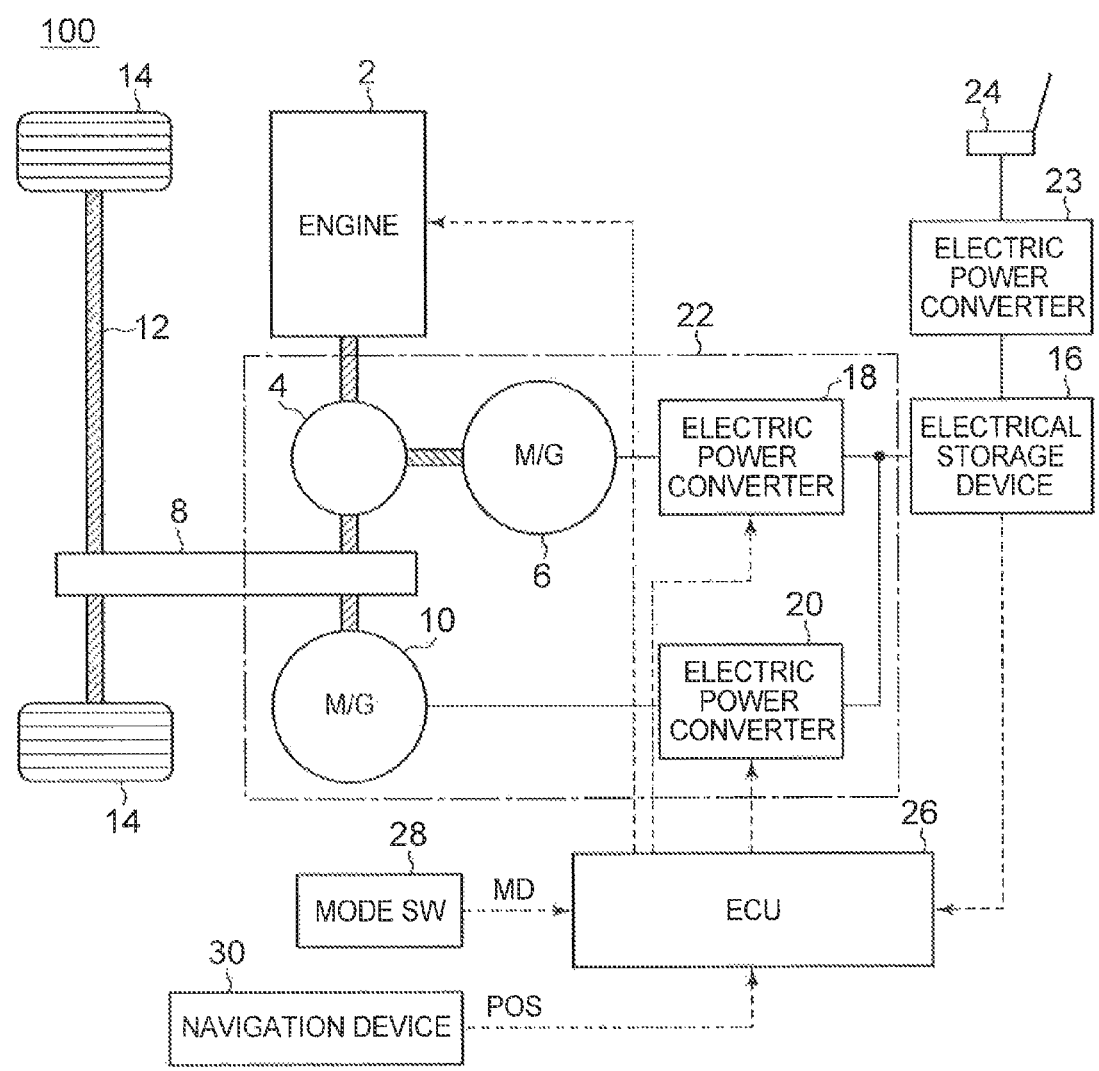
FIG. 1 is a block diagram illustrating the general configuration of a hybrid vehicle according to a first embodiment.

Disclosed embodiments will be described hereinafter in detail with reference to the drawings. Although a plurality of embodiments will be described hereinafter, any suitable combination of the configurations described in the respective embodiments has been presupposed since the filing of the present application. Incidentally, like or equivalent components are denoted by like reference symbols in the drawings, and the description thereof will not be repeated.

First Embodiment

FIG. 1 is a block diagram for illustrating the general configuration of a hybrid vehicle according to the first embodiment. Referring to FIG. 1, a hybrid vehicle 100 is equipped with an engine 2, a drive unit 22, a transmission gear 8, a drive shaft 12, wheels 14, an electrical storage device 16, an electronic control unit (an ECU) 26, a mode switch (a mode SW) 28, and a navigation device 30. Besides, this hybrid vehicle 100 is further equipped with an electric power converter 23 and a connection portion 24.

The engine 2 is an internal combustion engine that outputs motive power by converting thermal energy generated through the combustion of fuel into kinetic energy of a kinetic body such as a piston, a rotor or the like. Hydrocarbon fuels such as gasoline, light oil, ethanol, liquid hydrogen, natural gas and the like, or liquid or gaseous hydrogen fuels are suitable as the fuel for the engine 2.

The drive unit 22 includes a motive power division device 4, motor-generators 6 and 10, and electric power converters 18 and 20. The motor-generators 6 and 10 are alternating-current rotating electrical machines, and are, for example, three-phase alternating-current synchronous electric motors each having a rotor in which a permanent magnet is embedded. The motor-generator 6 is employed as a generator that is driven by the engine 2 via the motive power division device 4, and is also employed as an electric motor for starting the engine 2. The motor-generator 10 operates mainly as an electric motor, and drives the drive shaft 12. On the other hand, when the vehicle is braked or reduced in acceleration on a downhill slope, the motor-generator 10 operates as a generator to carry out regenerative electric power generation.

The motive power division device 4 includes, for example, a planetary gear mechanism having three rotary shafts, namely, a sun gear, a carrier, and a ring gear. The motive power division device 4 divides the driving force of the engine 2 into a motive power that is transmitted to a rotary shaft of the motor-generator 6, and a motive power that is transmitted to the transmission gear 8. The transmission gear 8 is coupled to the drive shaft 12 for driving the wheels 14. Besides, the transmission gear 8 is also coupled to a rotary shaft of the motor-generator 10.

The electrical storage device 16 is a rechargeable direct-current electric power supply, and is configured to include, for example, a secondary battery such as a nickel hydride battery, a lithium-ion battery or the like, a large-capacity capacitor and the like. The electrical storage device 16 supplies electric power to the electric power converters 18 and 20. Besides, when the motor-generator 6 and/or the motor-generator 10 generate/generates electric power, the electrical storage device 16 is charged upon receiving the generated electric power. Furthermore, the electrical storage device 16 can be charged upon receiving the electric power that is supplied from an electric power supply outside the vehicle through the connection portion 24.

Incidentally, the charging state of the electrical storage device 16 is represented by, for example, an SOC, that is, the percentage of a current electrical storage amount to a fully charged state of the electrical storage device 16. The SOC is calculated based on an output voltage and/or an input/output current of the electrical storage device 16, which are/is detected by, for example, a voltage sensor (not shown) and/or a current sensor (not shown). The SOC may be calculated by an ECU that is provided separately in the electrical storage device 16, or may be calculated by the ECU 26 based on detected values and/or a detected value of the output voltage and/or the input/output current of the electrical storage device 16.

The electric power converter 18 executes direct-current/alternating-current electric power conversion between the motor-generator 6 and the electrical storage device 16 in a bidirectional manner, based on a control signal received from the ECU 26. By the same token, the electric power converter 20 executes direct-current/alternating-current electric power conversion between the motor-generator 10 and the electrical storage device 16 in a bidirectional manner, based on a control signal received from the ECU 26. Thus, each of the motor-generators 6 and 10 can output a positive torque for operating as an electric motor or a negative torque for operating as a generator, while exchanging electric power with the electrical storage device 16. The electric power converters 18 and 20 are constructed by, for example, inverters. Incidentally, a step-up converter for direct-current voltage conversion can also be arranged between the electrical storage device 16 and each of the electric power converters 18 and 20.

The electric power converter 23 converts an electric power from the external electric power supply (not shown) outside the vehicle, which is electrically connected to the connection portion 24, into a voltage level of the electrical storage device 16, and outputs this voltage level to the electrical storage device 16 (the charging of the electrical storage device 16 by the external electric power supply will be referred to hereinafter also as "external charging"). The electric power converter 23 is configured to include, for example, a rectifier and an inverter. Incidentally, the method of electric power reception by the external electric power supply is not limited to contact electric power reception through the use of the connection portion 24. Electric power may be received in a non-contact manner from the external electric power supply through the use of an electric power reception coil or the like instead of the connection portion 24.

The ECU 26 includes a central processing unit (a CPU), a storage unit, input/output buffers and the like (not shown), and executes the control of respective components in the hybrid vehicle 100. Incidentally, these types of control are not limited to processes by software, and can also be executed by being processed by a dedicated piece of hardware (an electronic circuit). ECU 26 may be configured to perform disclosed functions. For example, ECU 26 may be programmed to perform disclosed functions. Digitized instructions, which may be stored or retrieved, may be executed by ECU 26 to perform disclosed functions. The digitized instructions may be stored in a non-transitory computer-readable medium.

As main control, the ECU 26 calculates a vehicle driving torque (a required torque value) based on a vehicle speed and an accelerator opening degree corresponding to an operation amount of an accelerator pedal, and calculates a vehicle driving power (a required value) based on the calculated vehicle driving torque. Then, the ECU 26 further calculates a required charging power of the electrical storage device 16 based on an SOC of the electrical storage device 16, and controls the engine 2 and the drive unit 22 so as to generate a power that is obtained by adding the required charging power to the vehicle driving power (hereinafter referred to as "a vehicle power").

When the vehicle power is small, the ECU 26 controls the drive unit 22 such that the hybrid vehicle runs using only the motor-generator 10 with the engine 2 stopped (EV running). When the vehicle power becomes large, the ECU 26 controls the engine 2 and the drive unit 22 such that the hybrid vehicle runs with the engine 2 in operation (HV running).

It should be noted herein that the ECU 26 executes running control to control the running of the vehicle by selectively applying a CD mode in which the SOC of the electrical storage device 16 is positively consumed by mainly carrying out EV running although permitting HV running, and a CS mode in which the SOC is controlled to a predetermined range by appropriately making a change-over between HV running and EV running.

Figure 2:
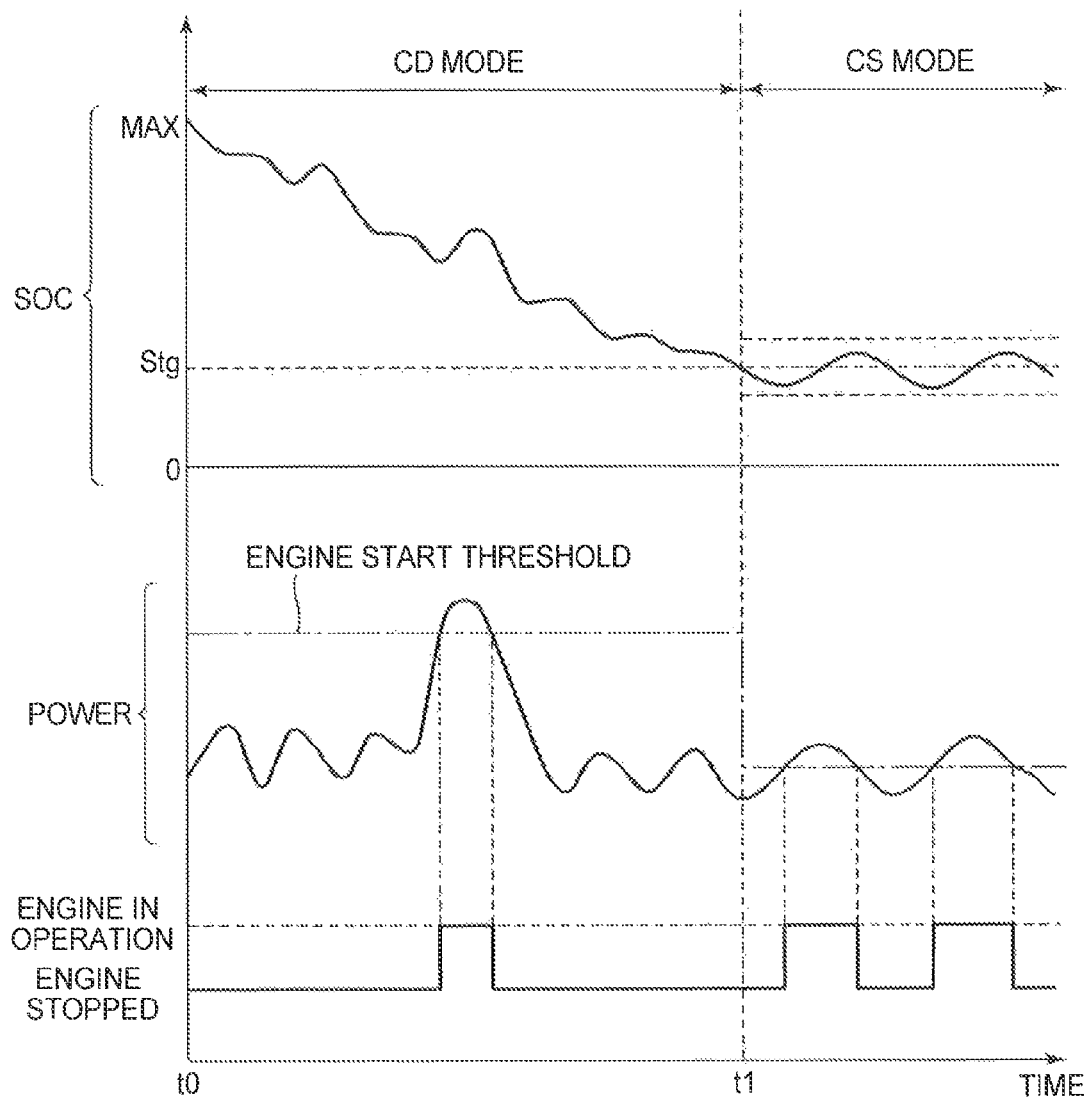
FIG. 2 is a view for illustrating a CD mode and a CS mode.

FIG. 2 is a view for illustrating the CD mode and the CS mode. Referring to FIG. 2, it is assumed that the hybrid vehicle starts running in the CD mode after the electrical storage device 16 is fully charged (SOC=MAX) through external charging by the external electric power supply.

The CD mode is a mode in which the SOC of the electrical storage device 16 is positively consumed, and is basically designed to consume the electric power stored in the electrical storage device 16 (mainly the electric energy obtained through external charging). While running in the CD mode, the engine 2 does not operate to maintain the SOC. In concrete terms, for example, the required charging power of the electrical storage device 16 is set to zero when the CD mode is selected. Thus, although the SOC may temporarily increase due to the regenerative electric power that is recovered at the time of deceleration or the like of the vehicle or the electric power that is generated as a result of operation of the engine 2, the ratio of discharge ends up being larger than the ratio of charge, so the SOC decreases as the running distance increases on the whole.

The CS mode is a mode in which the SOC of the electrical storage device 16 is controlled to a predetermined range. As an example, when the SOC decreases to a predetermined value Stg indicating a decrease in the SOC at a time point t1, the CS mode is selected, and the SOC is held within the predetermined range afterward. In concrete terms, the engine 2 operates when the SOC decreases (HV running), and the engine 2 stops when the SOC increases (EV running). That is, in the CS mode, the engine 2 operates to maintain the SOC.

When the vehicle power is smaller than a predetermined engine start threshold, this hybrid vehicle 100 runs using the motor-generator 10 with the engine 2 stopped (EV running). On the other hand, when the vehicle power exceeds the aforementioned engine start threshold, this hybrid vehicle 100 runs with the engine 2 in operation (HV running). During HV running, the hybrid vehicle 100 runs through the use of the driving force of the engine 2 in addition to the driving force of the motor-generator 10, or instead of the driving force of the motor-generator 10. The electric power that is generated by the motor-generator 6 as a result of operation of the engine 2 during HV running is directly supplied to the motor-generator 10 or stored into the electrical storage device 16.

It should be noted herein that the engine start threshold in the CD mode is larger than the engine start threshold in the CS mode. That is, the region in which the hybrid vehicle 100 carries out EV running in the CD mode is larger than the region in which the hybrid vehicle 100 carries out EV running in the CS mode. Thus, in the CD mode, the frequency with which the engine 2 starts is held low, and the number of opportunities for EV running is made larger than in the CS mode. On the other hand, in the CS mode, the hybrid vehicle 100 is controlled so as to efficiently run using both the engine 2 and the motor-generator 10.

In the CD mode as well, when the vehicle power (which is equal to the vehicle driving power) exceeds the engine start threshold, the engine 2 operates. Incidentally, even when the vehicle power has not exceeded the engine start threshold, the engine 2 may be permitted to operate at the time of warm-up or the like of the engine 2 and an exhaust catalyst. On the other hand, in the CS mode as well, the engine 2 stops when the SOC increases. That is, the CD mode is not limited to EV running in which the hybrid vehicle runs with the engine 2 constantly stopped, and the CS mode is not limited either to I-IV running in which the hybrid vehicle runs with the engine 2 constantly in operation. In the CS mode as well as the CD mode, both EV running and HV running are possible.

Referring again to FIG. 1, the mode switch 28 is an input device for allowing a user to select one of the CD mode and the CS mode. The mode switch 28 outputs a signal MD to the ECU 26 in response to the mode selected through the operation by the user. Incidentally, this mode switch 28 is not indispensable.

The navigation device 30 acquires host vehicle position information POS using a global positioning system (a GPS). Specifically, the navigation device 30 acquires the host vehicle position information POS by receiving electric waves from a GPS satellite. The navigation device 30 transmits the acquired host vehicle position information POS to the ECU 26.

The ECU 26 makes a changeover in mode between the CD mode and the CS mode in accordance with the SOC of the electrical storage device 16 or the operation of the mode switch 28 by a driver. Furthermore, the ECU 26 is configured to be able to make a changeover in mode between the CD mode and the CS mode based on the host vehicle position information POS that is transmitted from the navigation device 30. In the following description, running control for selectively applying the CD mode and the CS mode based on host vehicle position information in cooperation with the navigation device 30 will be referred to also as "navigation cooperative control".

In this navigation cooperative control, as described in the aforementioned Japanese Patent Application Publication No. 2010-241396 (JP 2010-241396 A), the CD mode is selected in an urban area or a running zone where vehicles are prohibited from passing or subject to fees when running using an engine that emits exhaust gas. On the other hand, the CS mode is selected when running in the suburbs or on a freeway where the engine 2 has good fuel efficiency. The ECU 26 automatically makes such a changeover in mode between the CD mode and the CS mode based on the host vehicle position information POS.

Then, the ECU 26 changes vehicle driving force characteristics between the CD mode and the CS mode such that the vehicle driving force for the same vehicle speed and the same accelerator opening degree becomes larger when the CD mode is selected in accordance with the SOC of the electrical storage device 16 or the operation of the mode switch 28 by the user than when the CS mode is selected. Thus, in the CD mode, a strong feeling of acceleration can be obtained during EV running while increasing the number of opportunities for EV running. As a result, special running in the CD mode can be realized. This point will be described hereinafter in detail.

Figure 3:
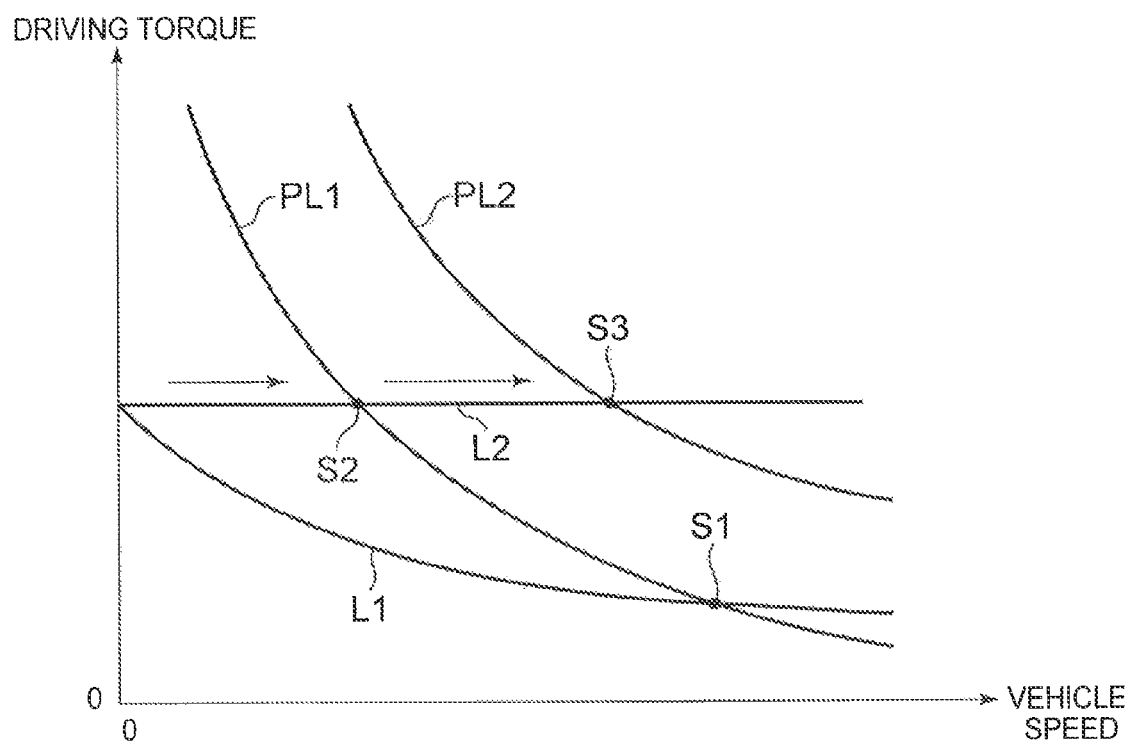
FIG. 3 is a view for illustrating the perspective on driving force characteristics in each of the CS mode and the CD mode.

FIG. 3 is a view for illustrating the perspective on driving force characteristics in each of the CS mode and the CD mode. Referring to FIG. 3, the axis of abscissa represents the speed of the vehicle, and the axis of ordinate represents the driving torque of the vehicle. A curve PL1 indicates a start threshold of the engine 2 (an iso-power line) at the time when the CS mode is selected, and a curve PL2 indicates a start power threshold of the engine 2 (an iso-power line) at the time when the CD mode is selected. As described above, the start power threshold of the engine 2 at the time when the CD mode is selected is larger than the start power threshold of the engine 2 at the time when the CS mode is selected.

A line L1 indicates driving force characteristics of the vehicle at the time when the accelerator opening degree is X % in the case where the CS mode is selected. That is, when the accelerator opening degree is X % in the case where the CS mode is selected, the vehicle driving torque (the required torque value) is determined in accordance with this line 1.

A line L2 indicates driving force characteristics of the vehicle at the time when the accelerator opening degree is X % in the case where the CD mode is selected. That is, when the accelerator opening degree is X % in the case where the CD mode is selected, the vehicle driving torque (the required torque value) is determined in accordance with this line L2.

Incidentally, the driving force characteristics at the time when the accelerator opening degree is X % are not limited to those indicated by the lines L1 and L2. However, with the hybrid vehicle 100 according to this first embodiment, the driving force characteristics are changed between the CD mode and the CS mode such that the vehicle driving torque for the same vehicle speed and the same accelerator opening degree becomes larger when the CD mode is selected than when the CS mode is selected.

When the CS mode is selected, the driving force characteristics are set such that the engine 2 does not start until reaching an operating point indicated by a point S1, by suppressing the driving torque as the vehicle speed increases, as indicated by the line L1. When the driving force characteristics for increasing the driving torque to an extent indicated by the line L2 are set for the purpose of obtaining a strong feeling of acceleration during EV running, the engine 2 prematurely starts at an operating point indicated by a point S2, and the number of opportunities for EV running significantly decreases.

On the other hand, as described above, the engine start power threshold at the time when the CD mode is selected is larger than the start power threshold at the time when the CS mode is selected. In concrete terms, the engine 2 does not start until the vehicle power (the vehicle driving power) reaches a line indicated by the curve PL2. Thus, with the hybrid vehicle 100 according to this first embodiment, the driving force characteristics are set such that the vehicle driving torque for the same vehicle speed and the same accelerator opening degree becomes larger when the CD mode is selected than when the CS mode is selected, as indicated by the line L2. When the CD mode is selected, the engine 2 does not start until reaching an operating point indicated by a point S3, even in the case where the driving force characteristics according to the line L2 are imparted. Thus, when the CD mode is selected, a strong acceleration torque can be realized during EV running along the line L2 while increasing the number of opportunities for EV running (from the point S2 to the point S3).

Referring again to FIG. 1, as described above, a changeover in mode between the CD mode and the CS mode is automatically made during navigation cooperative control, irrespective of the operation of the mode switch 28 by the user. As described with reference to FIG. 3, a strong feeling of acceleration can be obtained during EV running while increasing the number of opportunities for EV running in the CD mode, by changing the driving force characteristics as a changeover in mode is made. On the other hand, a changeover in mode is made at a timing that is not intended by the user, so a change in the driving force characteristics resulting from the changeover in mode may cause a feeling of strangeness to the user. For example, when the host vehicle position of the hybrid vehicle 100 shifts from an urban area to a freeway, the ECU 26 makes a changeover in mode from the CS mode to the CD mode, and automatically changes the driving force characteristics as the changeover in mode is made. In this case, the vehicle driving force for the same vehicle speed and the same accelerator opening degree increases when the changeover in mode is made. Therefore, the change (increase) in the driving force resulting from the changeover in mode can cause a feeling of strangeness to the user.

Thus, with the hybrid vehicle 100 according to this first embodiment, the driving force characteristics are not changed in accordance with a changeover in mode in the case where navigation cooperative control is executed. Thus, a feeling of strangeness that is caused to the user by the change in the driving force characteristics resulting from a changeover in mode that is not intended by the user can be alleviated.

Figure 4:
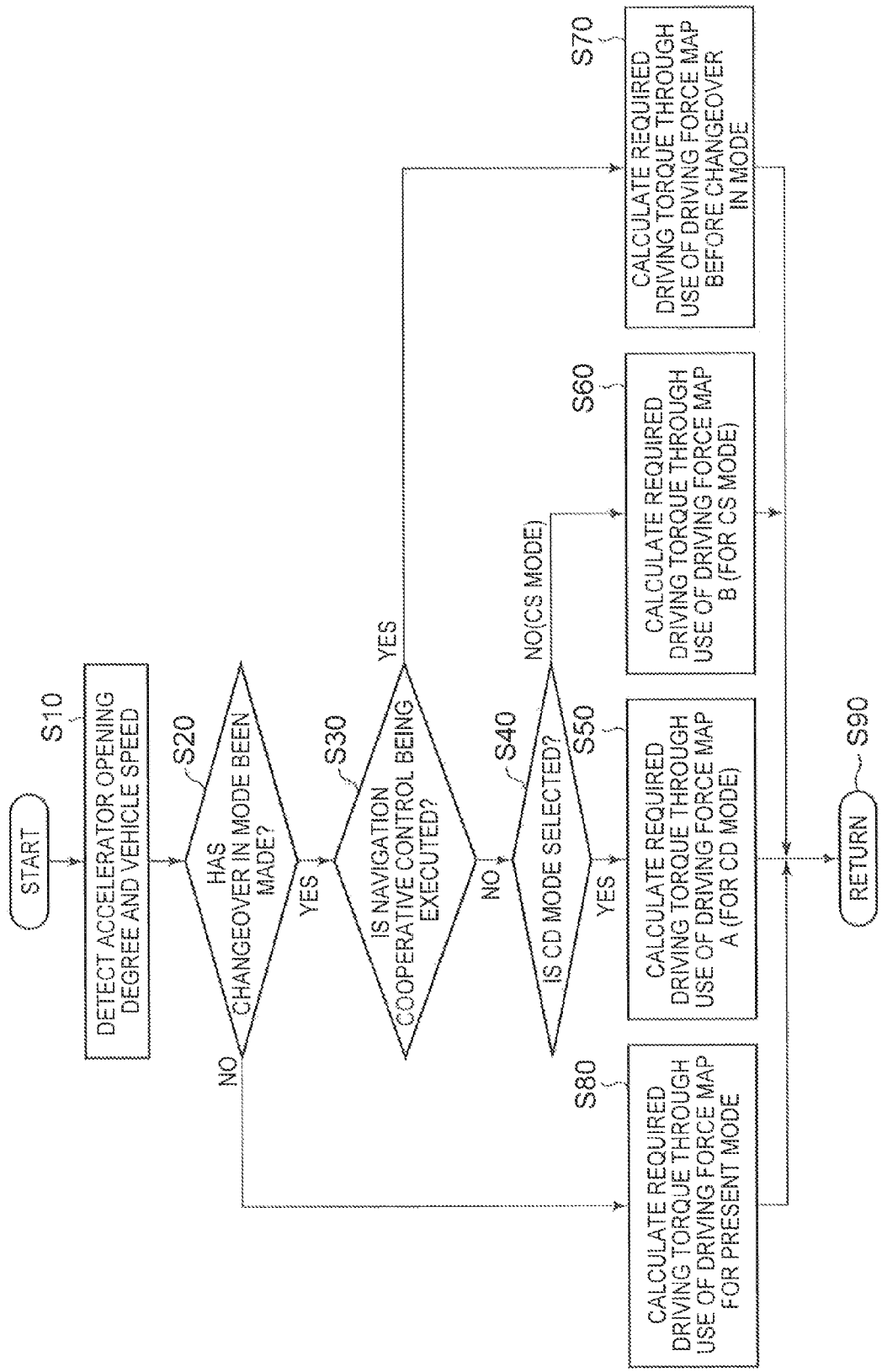
FIG. 4 is a flowchart for illustrating a processing procedure that is executed by an Electronic Control Unit (ECU) (e.g., shown in FIG. 1) to calculate a vehicle driving torque (a required torque value)

FIG. 4 is a flowchart for illustrating the procedure of a process that is executed by the ECU 26 shown in FIG. 1 to calculate a vehicle driving torque (a required torquevalue). Incidentally, the process shown in this flowchart is called out from a main routine and executed at intervals of a predetermined time or upon fulfillment of a predetermined condition.

Referring to FIG. 4, the ECU 26 receives detected values of the accelerator opening degree and the vehicle speed (step S10). Incidentally, the accelerator opening degree is detected by an accelerator opening degree sensor (not shown), and the vehicle speed is detected by a vehicle speed sensor. The vehicle speed sensor detects the vehicle speed by detecting, for example, the rotational speed of an axle.

Subsequently, the ECU 26 determines whether or not a changeover in mode between the CD mode and the CS mode has been made (step S20). For example, a changeover in mode can be made based on the SOC of the electrical storage device 16 as shown in FIG. 2, in accordance with the operation of the mode switch 28 (FIG. 1) by the user, or based on the host vehicle position information POS from the navigation device 30 (FIG. 1).

If it is determined in step S20 that a changeover in mode has been made (YES in step S20), the ECU 26 determines whether or not navigation cooperative control is being executed (step S30). For example, when the SOC is higher than the predetermined value Stg (FIG. 2) indicating a decrease in the SOC in the case where a changeover in mode is made irrespective of the operation of the mode switch 28 by the user, it can be determined that navigation cooperative control is being executed.

If it is determined in step S30 that navigation cooperative control is not being executed (NO in step S30), the ECU 26 determines whether or not the CD mode is selected (step S40). Incidentally, it may be determined herein whether or not the CS mode is selected. Then, if it is determined that the CD mode is selected (YES in step S40), the ECU 26 calculates a required driving torque of the vehicle (a required value or a target value of the vehicle driving torque) based on the accelerator opening degree and vehicle speed detected in step S10, through the use of a driving force map A (which will be described later) for the CD mode (step S50).

On the other hand, if it is determined in step S40 that the CS mode is selected (NO in step S40), the ECU 26 calculates a required driving torque based on the accelerator opening degree and vehicle speed detected in step S10, through the use of a driving force map B (which will be described later) for the CS mode (step S60).

Figure 5:
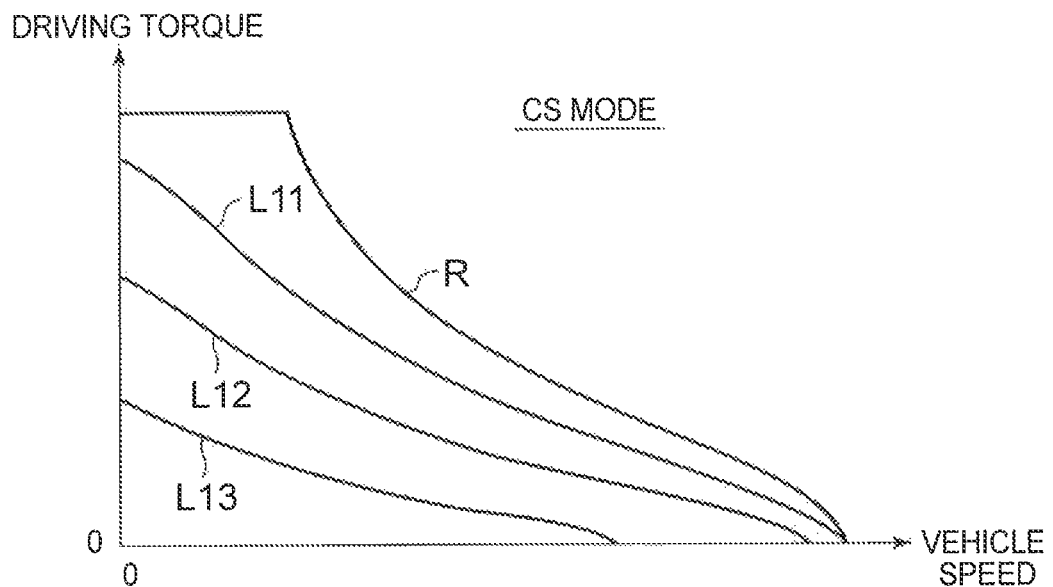
FIG. 5 is a view showing an exemplary driving force map for the CS mode.

FIG. 5 is a view showing an example of the driving force map B for the CS mode. Referring to FIG. 5, the axis of abscissa represents the speed of the vehicle, and the axis of ordinate represents the driving torque of the vehicle. A line R indicates a rated output line. A line L11 indicates driving force characteristics of the vehicle at the time when the accelerator opening degree is X2%. Lines L12 and L13 indicate driving force characteristics at the time when the accelerator opening degree is X2% and X3% (X1>X2>X3) respectively. Incidentally, although not shown when the accelerator opening degree assumes a value other than X1%, X2% and X3%, the line indicating driving force characteristics shifts rightward and upward in the drawing as the accelerator opening degree increases.

Figure 6:
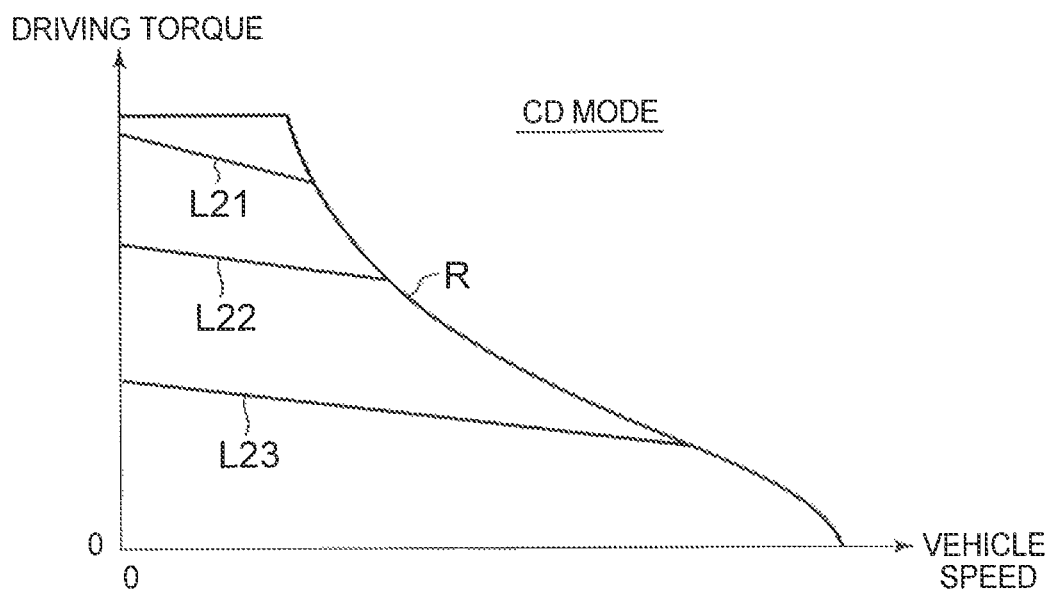
FIG. 6 is a view showing an exemplary driving force map for the CD mode.

On the other hand, FIG. 6 is a view showing an example of the driving force map A for the CD mode. This FIG. 6 corresponds to FIG. 5. Referring to FIG. 6, a line L21 indicates driving force characteristics of the vehicle at the time when the accelerator opening degree is X1%, and lines L22 and L23 indicate driving force characteristics at the time when the accelerator opening degree is X2% and X3% respectively.

Referring to FIGS. 5 and 6, as is apparent from contrasts at the same accelerator opening degree (a contrast between the line L11 and the line L21, a contrast between the line L12 and the line L22, and a contrast between the line L13 and the line L23), the driving force characteristics of the vehicle are changed between the CD mode and the CS mode such that the vehicle driving torque for the same vehicle speed and the same accelerator opening degree becomes larger when the CD mode is selected (FIG. 6) than when the CS mode is selected (FIG. 5). Thus, in the CD mode, a strong feeling of acceleration can be obtained during EV running while increasing the number of opportunities for EV running.

Incidentally, as shown in FIGS. 5 and 6, it is preferable to change the driving force characteristics between the CD mode and the CS mode such that the decrease in the vehicle driving torque corresponding to the increase in the vehicle speed at the same accelerator opening degree becomes smaller when the CD mode is selected (FIG. 6) than when the CS mode is selected (FIG. 5), in a range where the vehicle driving torque is below the rated output line R. In concrete terms, with regard to, for example, the contrast between the line L12 (the CS mode) and the line L22 (the CD mode) at the same accelerator opening degree, the gradient of the line L22 (the degree of decrease in the vehicle driving torque corresponding to the increase in vehicle speed) in the CD mode is smaller than the gradient of the line L12 in the CS mode. Thus, a more extended feeling of acceleration (an increased feeling of the maintenance of the driving force with respect to the increase in vehicle speed) is obtained when the CD mode is selected than when the CS mode is selected.

Referring again to FIG. 4, if it is determined in step S30 that navigation cooperative control is being executed (YES in step S30), the ECU 26 calculates a required driving torque of the vehicle based on the accelerator opening degree and vehicle speed detected in step S10, through the use of a driving force map before a changeover in mode (step S70). That is, if it is determined that navigation cooperative control is being executed, a change in the driving force characteristics resulting from a changeover in mode that is not intended by the user can cause a feeling of strangeness to the user, so the driving force characteristics are not changed in accordance with the changeover in mode.

According to step S70, when navigation cooperative control is being executed, the vehicle driving torque is calculated through the use of the same driving force map regardless of whether the changeover has been made or not. It is preferable that this same driving force map be the driving force map A (FIG. 6) for the CD mode. In other words, it is preferable that both the driving force characteristics at the time when the CD mode is selected and the driving force characteristics at the time when the CS mode is selected be equivalent to the driving force characteristics at the time when the CD mode is selected in accordance with the operation of the mode switch 28 by the user or the SOC, during the execution of navigation cooperative control. Thus, special running that is highly satisfactory to the user can be realized in the CD mode even during the execution of navigation cooperative control.

On the other hand, if it is determined in step S20 that no changeover in mode has been made (NO in step S20), the ECU 26 calculates a required driving torque of the vehicle based on the accelerator opening degree and vehicle speed detected in step S10, through the use of the driving force map for the present mode (the driving force map A when the present mode is the CD mode, and the driving force map B when the present mode is the CS mode) (step S80).

Incidentally, as described above, the driving force map for the present mode is the driving force map A (FIG. 6) even when the present mode is the CS mode, during the execution of navigation cooperative control. Therefore, in step S80, the ECU 26 calculates a required driving torque of the vehicle based on the accelerator opening degree and vehicle speed detected in step S10 through the use of the driving force map A, regardless of whether the present mode is the CD mode or the CS mode.

As described above, in this first embodiment, the number of opportunities for EV running in the CD mode is increased, and moreover, the acceleration performance of EV running in the CD mode is advanced by changing the driving force characteristics of the vehicle in accordance with a changeover in mode. Thus, in the CD mode, a strong feeling of acceleration can be obtained during EV running while increasing the number of opportunities for EV running.

It should be noted herein that a change in the driving force characteristics resulting from a changeover in mode that is not intended by the user can cause a sense of strangeness to the user during the execution of navigation cooperative control, namely, when the changeover in mode is made based on host vehicle position information. Therefore, the driving force characteristics are not changed in accordance with the changeover in mode. Accordingly, this first embodiment makes it possible to realize special running in the CD mode, and alleviate a feeling of strangeness that is caused to the user as a result of its realization.

Second Embodiment

With a hybrid vehicle according to this second embodiment, in the case where the driving force characteristics of the vehicle are changed in accordance with a changeover in mode between the CD mode and the CS mode, a slow change process is executed to change the driving torque of the vehicle in such a manner as to approach a value after the changeover in mode from a value before the changeover in mode as time passes.

That is, a strong feeling of acceleration can be obtained during EV running while increasing the number of opportunities for EV running in the CD mode, by changing the driving force characteristics in accordance with a changeover in mode. However, a change in the driving force characteristics resulting from the changeover in mode may cause a feeling of strangeness to the user.

Thus, with the hybrid vehicle according to this second embodiment, the aforementioned slow change process is executed in the case where the driving force characteristics are changed in accordance with a changeover in mode. Thus, a change in the driving torque resulting from the changeover in mode is alleviated. As a result, special running in the CD mode can be realized, and a feeling of strangeness that can be caused to the user as a result of the change in the driving force characteristics can be alleviated. The general configuration of the hybrid vehicle according to this second embodiment may be identical to that of the hybrid vehicle 100 shown in FIG. 1.

With the hybrid vehicle according to this second embodiment, the degree of blunting the waveform of the vehicle driving torque in the aforementioned slow change process is made larger when a changeover in mode is made according to navigation cooperative control than when a changeover in mode is made in accordance with the operation of the mode switch 28 by the user or the SOC of the electrical storage device 16. In other words, the vehicle driving torque is changed from a value before the changeover in mode to a value after the changeover in mode over a longer time when the changeover in mode is made according to navigation cooperative control than when the changeover in mode is made in accordance with the operation of the mode switch 28 by the user or the SOC.

As described above, in the case where a changeover in mode is made according to navigation cooperative control, the changeover in mode is made in an aspect that is difficult for the user to perceive, so a change in the driving force characteristics resulting from the changeover in mode can cause a feeling of strangeness to the user. Therefore, the speed of change in the vehicle driving torque in the slow change process is more strictly limited than in the case where the changeover in mode is made in accordance with the operation of the mode switch 28 or the SOC.

Incidentally, as for the slow change process, the changing of the vehicle driving torque in such a manner as to approach the value after the changeover in mode from the value before the changeover in mode as time passes means that the vehicle driving torque is not changed stepwise at a time from the value before the changeover in mode to the value after the changeover in mode. This slow change process includes, for example, a rate process for limiting the rate of change in the vehicle driving torque, a "smoothing" process for performing a lag process through the use of a lag filter or the like, a process for gradually changing the vehicle driving torque, or the like.

Figure 7:
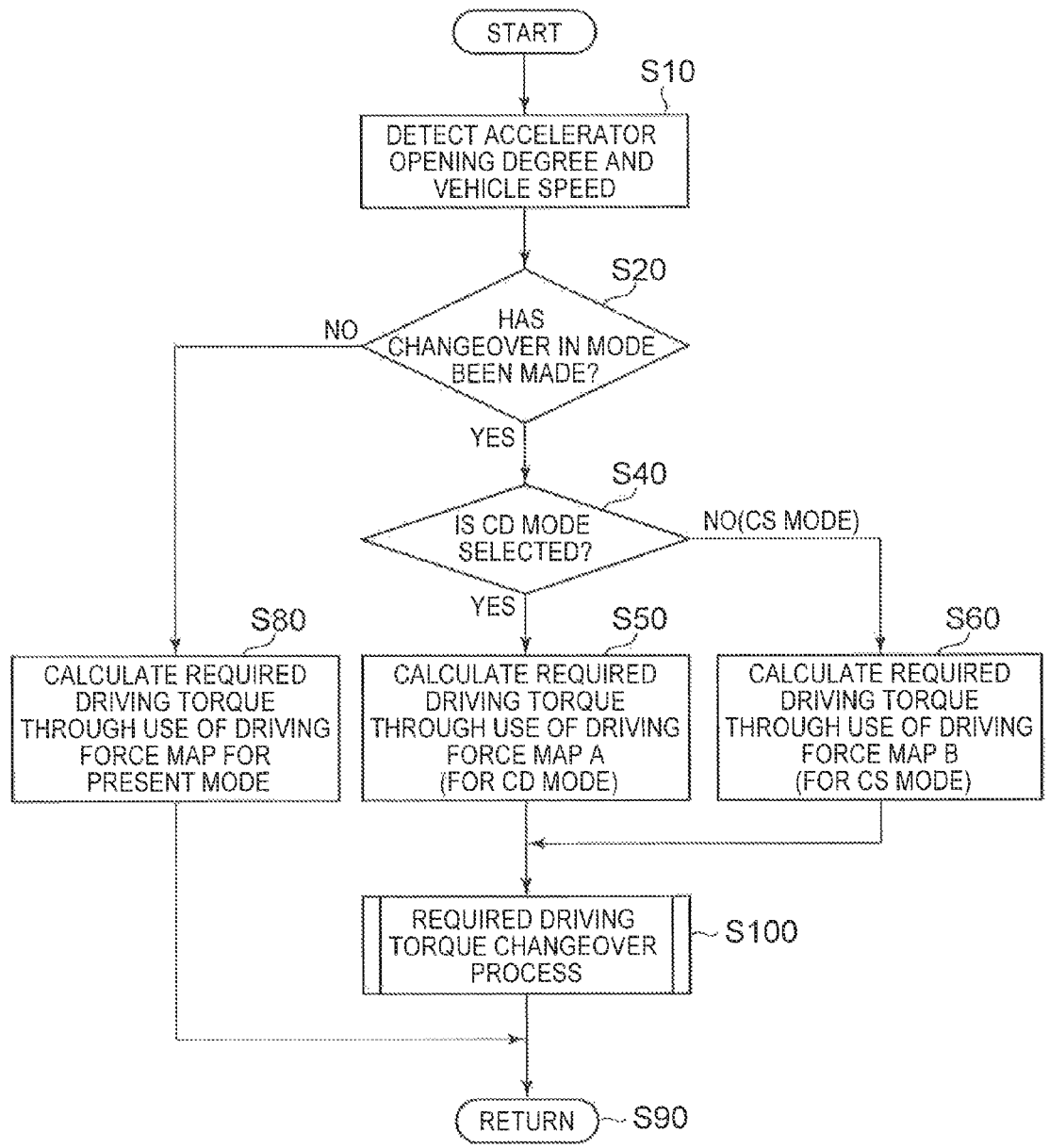
FIG. 7 is a flowchart for illustrating a processing procedure that is executed by an ECU of a second embodiment to calculate a vehicle driving torque (a required torque value)

FIG. 7 is a flowchart for illustrating the procedure of a process that is executed by the ECU 26 of the second embodiment to calculate a vehicle driving torque (a required torque value). Incidentally, the process shown in this flowchart is called out from a main routine and executed at intervals of a predetermined time or upon fulfillment of a predetermined condition.

Referring to FIG. 7, upon receiving detected values of the accelerator opening degree and the vehicle speed in step S10 similar to that of FIG. 4, the ECU 26 determines, in step S20 similar to that of FIG. 4, whether or not a changeover in mode between the CD mode and the CS mode has been made.

If it is determined in step S20 that a changeover in mode has been made (YES in step S20), the ECU 26 determines, in step S40 similar to that of FIG. 4, whether or not the CD mode is selected. Incidentally, it may be determined herein whether or not the CS mode is selected. Then, if it is determined that the CD mode is selected (YES in step S40), the ECU 26 calculates a required driving torque of the vehicle (a required value or a target value of the vehicle driving torque) based on the accelerator opening degree and vehicle speed detected in step S10, through the use of the driving force map A (FIG. 6) for the CD mode (step S50).

On the other hand, if it is determined in step S40 that the CS mode is selected (NO in step S40), the ECU 26 calculates a required driving torque based on the accelerator opening degree and vehicle speed detected in step S10, through the use of the driving force map B (FIG. 5) for the CS mode (step S60).

Then, when the required driving torque is calculated in step S50 or step S60 similar to those of FIG. 4, the ECU 26 executes a changeover process of the required driving torque (step S100). In this required driving torque changeover process, a slow change process is executed such that the required driving torque approaches a value after the changeover in mode from a value before the changeover in mode as time passes. The details of the required driving torque changeover process will be described later.

If it is determined in step S20 that no changeover in mode has been made (NO in step S20), the ECU 26 maintains the present mode (the CD mode or the CS mode). In step S80 similar to that of FIG. 4, the ECU 26 calculates a required driving torque of the vehicle based on the accelerator opening degree and vehicle speed detected in step S10, through the use of a driving force map for the present mode (the driving force map A when the present mode is the CD mode, and the driving force map B when the present mode is the CS mode).

Figure 8:
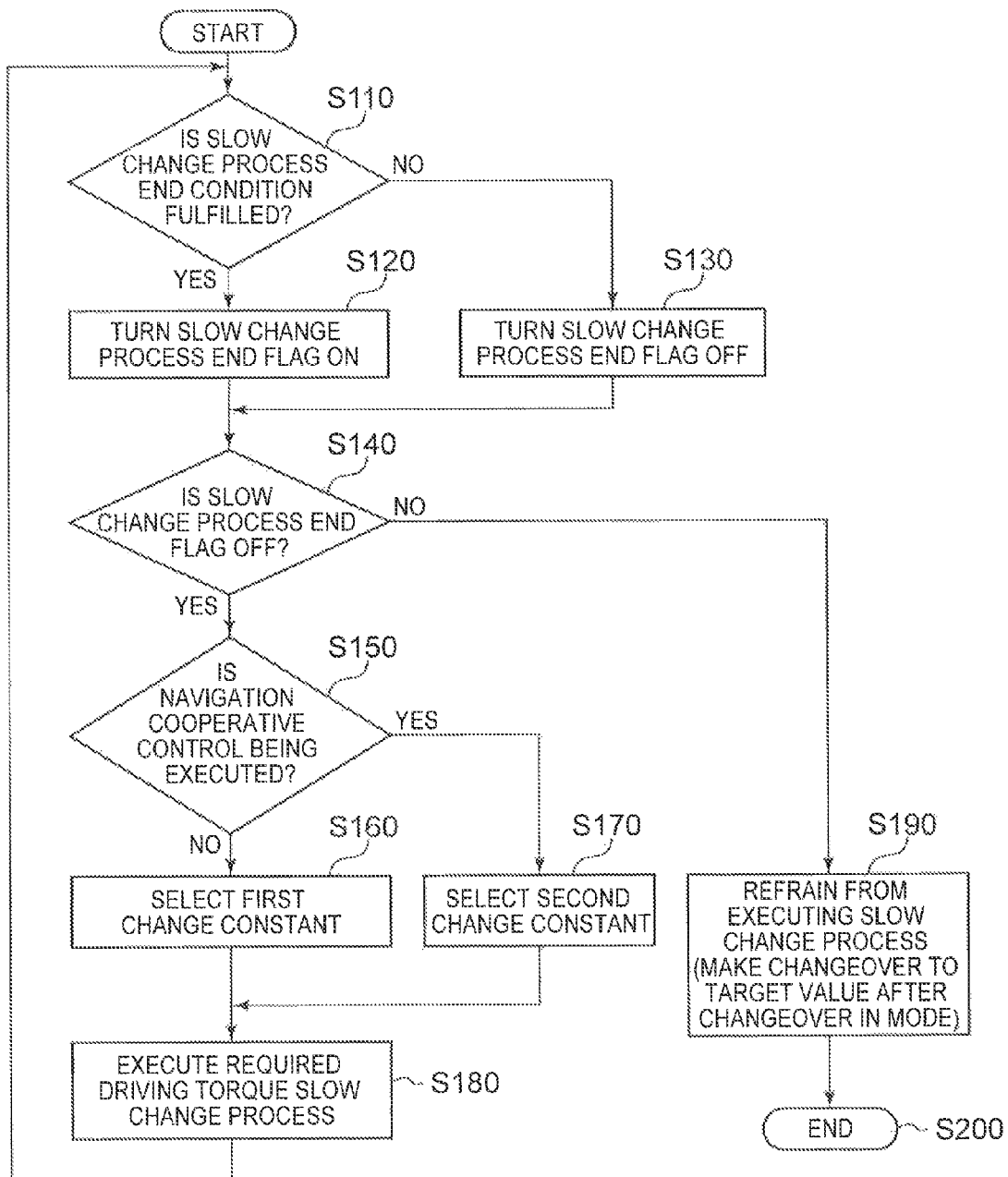
FIG. 8 is a flowchart for illustrating the procedure of a required driving torque changeover process shown in FIG. 7.

FIG. 8 is a flowchart for illustrating the procedure of the required driving torque changeover process shown in FIG. 7. Referring to FIG. 8, the ECU 26 determines whether or not a condition for ending a slow change process is fulfilled (step S110). As described above, the slow change process is a process for changing the required driving torque in such a manner as to approach a value after the changeover in mode from a value before the changeover in mode as time passes. Then, a condition for ending the slow change process is fulfilled, for example, when the difference between the required driving torque after the changeover in mode (a post-changeover target value) and the current value of the required driving torque becomes equal to or smaller than a predetermined value, or when a predetermined time elapses after the changeover in mode.

Then, if it is determined in step S110 that the condition for ending the slow change process is fulfilled (YES in step S110), the ECU 26 turns a slow change process end flag ON (step S120). On the other hand, if it is determined in step S110 that the condition for ending the slow change process is not fulfilled (NO in step S110), the ECU 26 turns the slow change process end flag OFF (step S130). Incidentally, the slow change process end flag is OFF immediately after the start of the required driving torque changeover process.

Subsequently, the ECU 26 determines whether or not the slow change process end flag is OFF (step S140). Then, if it is determined that the slow change process end flag is OFF (YES in step S140), the ECU 26 executes the slow change process of the required driving torque. In concrete terms, the ECU 26 subjects the change in the required driving torque resulting from the changeover in mode to, for example, a rate process for limiting the rate of change in the vehicle driving torque, a "smoothing" process for performing a lag process through the use of a lag filter or the like, a process for gradually changing the vehicle driving torque, or the like.

In this slow change process, the ECU 26 makes the setting for prescribing the limitations on the speed of change in the vehicle driving torque in the slow change process different, depending on whether the changeover in mode has been made according to navigation cooperative control or has been made in accordance with the operation of the mode switch 28 by the user or the SOC of the electrical storage device 16.

In concrete terms, the ECU 26 first determines whether or not navigation cooperative control is being executed (step S150). For example, when the SOC is higher than the predetermined value Stg (FIG. 2) indicating a decrease in the SOC in the case where a changeover in mode is made irrespective of the operation of the mode switch 28 by the user, it can be determined that navigation cooperative control is being executed.

If it is determined in step S150 that navigation cooperative control is not being executed (NO in step S150), the ECU 26 selects a first change constant as to the change constant that is used in the slow change process of the required driving torque that is executed in step S180, which will be described later (step S160).

On the other hand, if it is determined in step S150 that navigation cooperative control is being executed (YES in step S150), the ECU 26 selects a second change constant as to the change constant that is used in the slow change process of the required driving torque that is executed in step S180 (step S170).

It should be noted herein that the first change constant and the second change constant are set such that the degree of blunting the rising and falling waveforms of the required driving torque becomes larger (i.e., the speed of change in the required driving torque is more strictly limited) when the changeover in mode is made according to navigation cooperative control than when the changeover in mode is made in accordance with the operation of the mode switch 28 or the SOC.

Figure 9:
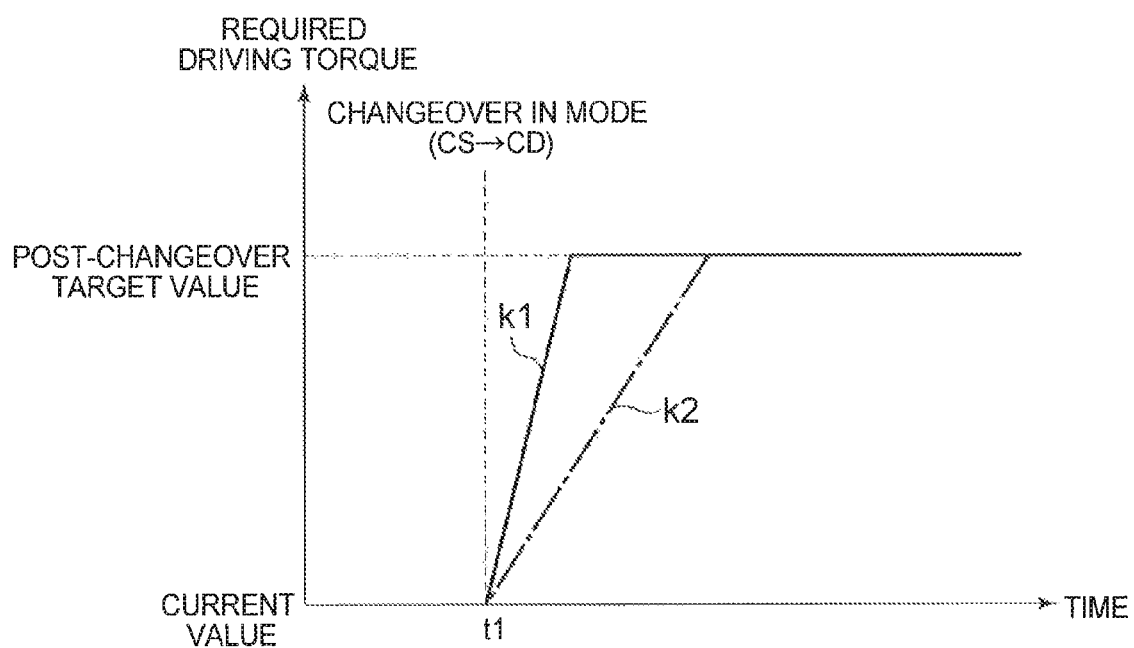
FIG. 9 is a view for illustrating an exemplary slow change process that is executed in the required driving torque changeover process.

FIG. 9 is a view for illustrating an exemplary slow change process that is executed in the required driving torque changeover process. Referring to FIG. 9, the axis of abscissa represents time, and the axis of ordinate represents required driving torque. At the time point t1, a changeover in mode from the CS mode to the CD mode is made, and as a result, the target value of the required driving torque increases.

A line k1 indicates changes in the required driving torque in the case where the changeover in mode is made in accordance with the operation of the mode switch 28 or the SOC. A line k2 indicates changes in the required driving torque in the case where the changeover in mode is made according to navigation cooperative control.

In this manner, the speed of change in the required driving torque in the slow change process is more strictly limited when the changeover in mode is made according to navigation cooperative control than when the changeover in mode is made in accordance with the operation of the mode switch 28 or the SOC. As a result, as shown in FIG. 9, the required driving torque changes from a current value to a target value over a longer time when the changeover in mode is made according to navigation cooperative control than when the changeover in mode is made in accordance with the operation of the mode switch 28 or the SOC. Thus, a feeling of strangeness that is caused to the user as a result of a changeover in mode at a timing that is not intended by the user can be alleviated during the execution of navigation cooperative control.

Returning to FIG. 8, the ECU 26 executes the slow change process to change the required driving torque in such a manner as to approach a value after the changeover in mode from a value before the changeover in mode as time passes, through the use of the change constant selected in step S160 or step S170. This slow change process, to which the change in the required driving torque resulting from the changeover in mode is subjected, includes, for example, a rate process (see FIG. 9) for limiting the rate of change in the vehicle driving torque, a "smoothing" process for performing a lag process through the use of a lag filter or the like, a process for gradually changing the required driving torque, or the like.

In the case where the slow change process is a rate process, the aforementioned change constant is, for example, a limiting value of the rate of change in the required driving torque. The limiting value of the rate of change as the second change constant is set smaller than the limiting value of the rate of change as the first change constant.

Besides, in the case where the slow change process is a smoothing process, the aforementioned change constant is, for example, a time constant of a lag filter. The time constant as the second change constant is set larger than the time constant as the first change constant. After that, the ECU 26 returns the process to step S110.

Then, if it is determined in step S140 that the slow change process end flag is ON (NO in step S140), the ECU 26 refrains from executing the aforementioned slow change process (step S190). That is, in this case, the required driving torque is immediately changed to the required driving torque after the changeover in mode (the post-changeover target value).

As described above, in this second embodiment, the change in the driving torque resulting from the changeover in mode is alleviated by executing the aforementioned slow change process in the case where the driving force characteristics are changed in accordance with the changeover in mode. In this slow change process, the speed of change in the required driving torque is more strictly limited when the changeover in mode is made based on host vehicle position information than when the changeover in mode is made in accordance with the operation of the mode switch 28 or the SOC of the electrical storage device 16. Thus, a feeling of strangeness that can be caused to the user by a change in the driving force characteristics resulting from a changeover in mode that is not intended by the user can be alleviated. Accordingly, this second embodiment may make it possible to realize special running in the CD mode, and alleviate a feeling of strangeness that is caused to the user as a result of its realization.

As described above, this second embodiment also makes it possible to obtain an effect similar to that of the aforementioned first embodiment.

[Modification Example of Second Embodiment]

When the amount of change in the required driving torque is smaller than the predetermined value in the case where a changeover in mode is made according to navigation cooperative control, the first change constant may be selected as to the change constant that is used in the slow change process of the required driving torque. When the amount of change in the required driving torque is smaller than the predetermined value, the user does not feel much feeling of strangeness at the time of the changeover in mode. Therefore, the decrease in torque responsiveness resulting from the slow change process can be held at its minimum necessary level, by executing the slow change process through the use of the same change constant as in the case where the changeover in mode is made in accordance with the operation of the mode switch 28 or the SOC. Incidentally, the predetermined value is set to such a value that the user does not feel a feeling of strangeness even when the slow change process is executed through the use of the first change constant.

Figure 10:
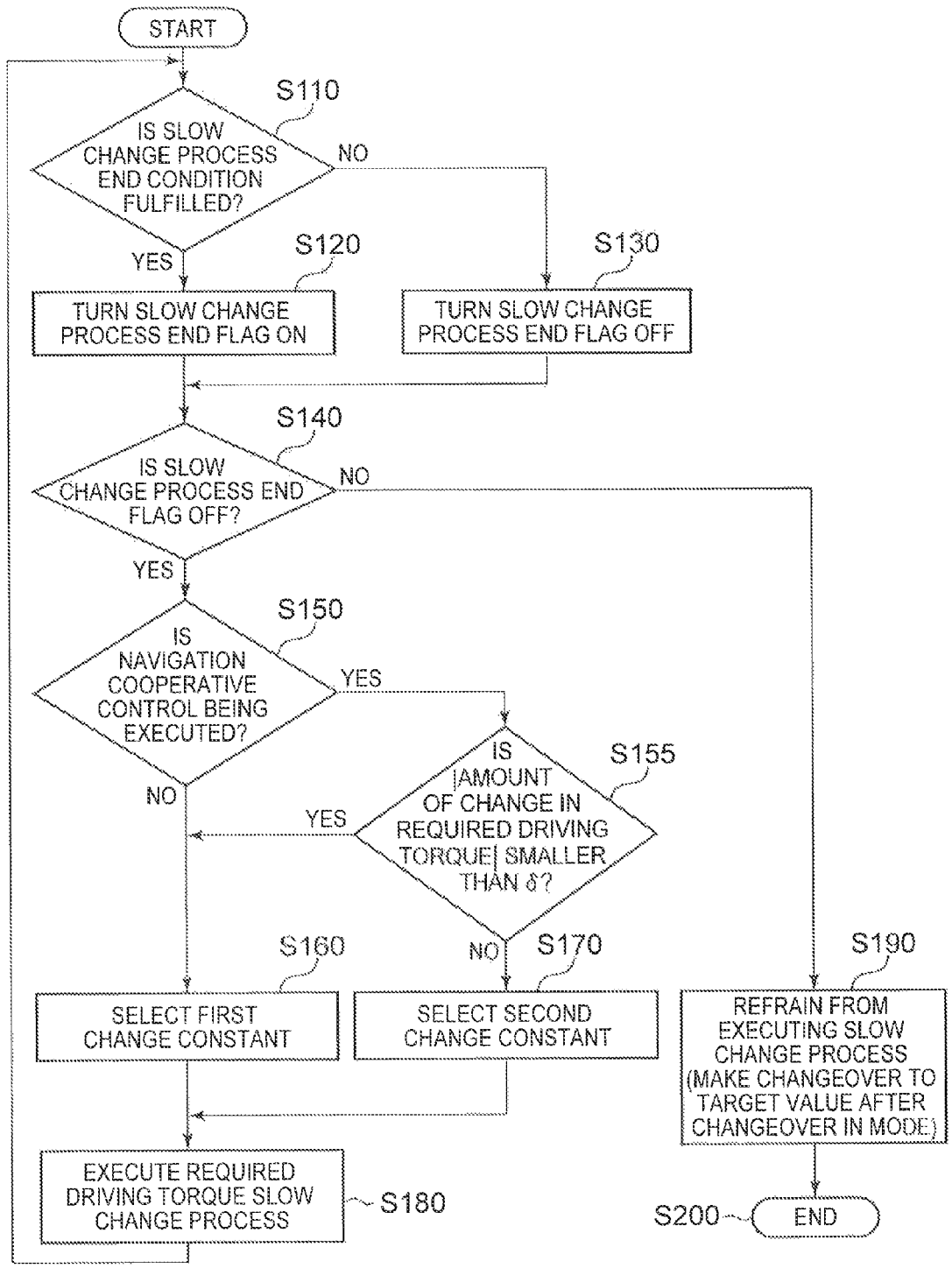
FIG. 10 is a flowchart for illustrating the procedure of a required driving torque changeover process in a modification example of the second embodiment.

FIG. 10 is a flowchart for illustrating the procedure of a required driving torque changeover process in this modification example. Incidentally, this flowchart is a substitute for the flowchart shown in FIG. 8 in the second embodiment.

Referring to FIG. 10, this flowchart includes step S155 in the flowchart shown in FIG. 8. That is, if it is determined in step S150 that navigation cooperative control is being executed (YES in step S150), the ECU 26 determines whether or not the absolute value of the amount of change in the required driving torque resulting from a changeover in mode is smaller than a predetermined value δ (step S155).

Then, if it is determined that the absolute value of the amount of change in the required driving torque resulting from the changeover in mode is smaller than the predetermined value δ (NO in step S112), the process proceeds to step S160, and the ECU 26 selects the first change constant as to the change constant that is used in the slow change process of the required driving torque that is executed in step S180. Accordingly, in this case, the limitations on the speed of change in the required driving torque through the slow change process are loosened (a rapid change in torque is permitted).

On the other hand, if it is determined in step S155 that the absolute value of the amount of change in the required driving torque resulting from the changeover in mode is equal to or larger than the predetermined value δ (NO in step S155), the process proceeds to step S170, and the ECU 26 selects the second change constant as to the change constant that is used in the slow change process of the required driving torque that is executed in step S180. Accordingly, in this case, the speed of change in the required driving torque resulting from the slow change process is strictly limited.

This modification example makes it possible to hold the decrease in torque responsiveness resulting from the slow change process at its minimum necessary level.

[First Modification Example of Hybrid Vehicle]

In the aforementioned first and second embodiments, the configuration in which a changeover in mode between the CD mode and the CS mode is made based on the host vehicle position information that is transmitted from the navigation device 30 to the ECU 26 has been described. However, the communication device for acquiring the host vehicle position information is not limited to in-vehicle devices.

Figure 11:
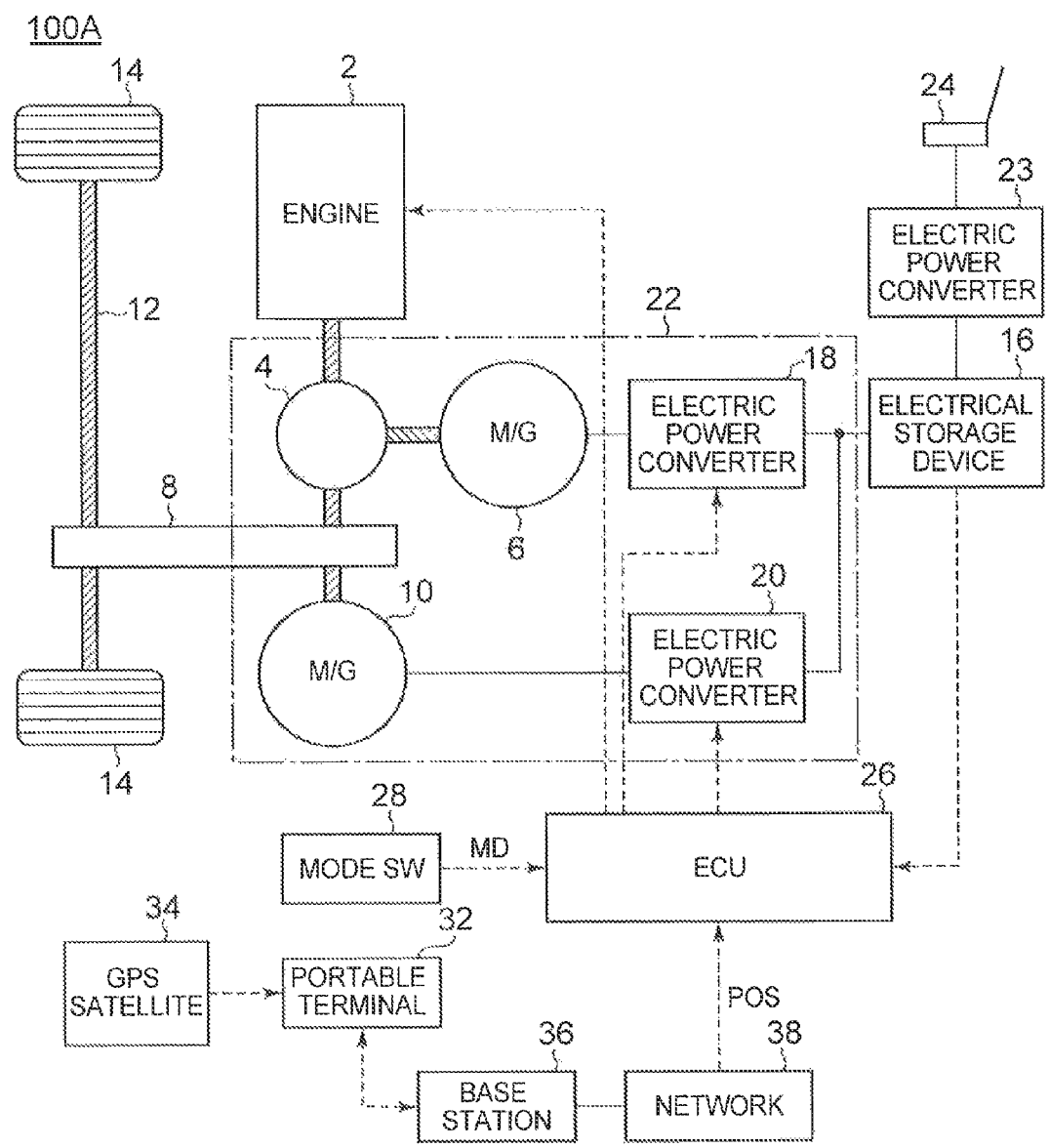
FIG. 11 is a block diagram illustrating a first modification example of the general configuration of the hybrid vehicle.

For example, as shown in FIG. 11, the control described in the aforementioned first and second embodiments is also applicable to a hybrid vehicle 100A that is configured to make a changeover in mode between the CD mode and the CS mode based on host vehicle position information that is transmitted from a portable terminal having a GPS function to the ECU 26.

Incidentally, the user carries the portable terminal 32 and is on board the hybrid vehicle 100A shown in FIG. 11. In this state, the portable terminal 32 and the ECU 26 can communicate with a network 38 via public wireless communication.

Upon acquiring current position information by receiving electric waves from a GPS satellite 34, the portable terminal 32 transmits the acquired position information to the network 38 via a base station 36. The ECU 26 can acquire host vehicle position information by establishing data communication with the network 38 via the base station 36.

[Second Modification Example of Hybrid Vehicle]

In the aforementioned first and second embodiments, the control in the hybrid vehicle 100 (FIG. 1) that is configured such that the engine 2 is coupled to the two motor-generators 6 and 10 by the motive power division device 4 has been described. However, the hybrid vehicle to which this disclosure is applied is not limited to such a configuration.

Figure 12:
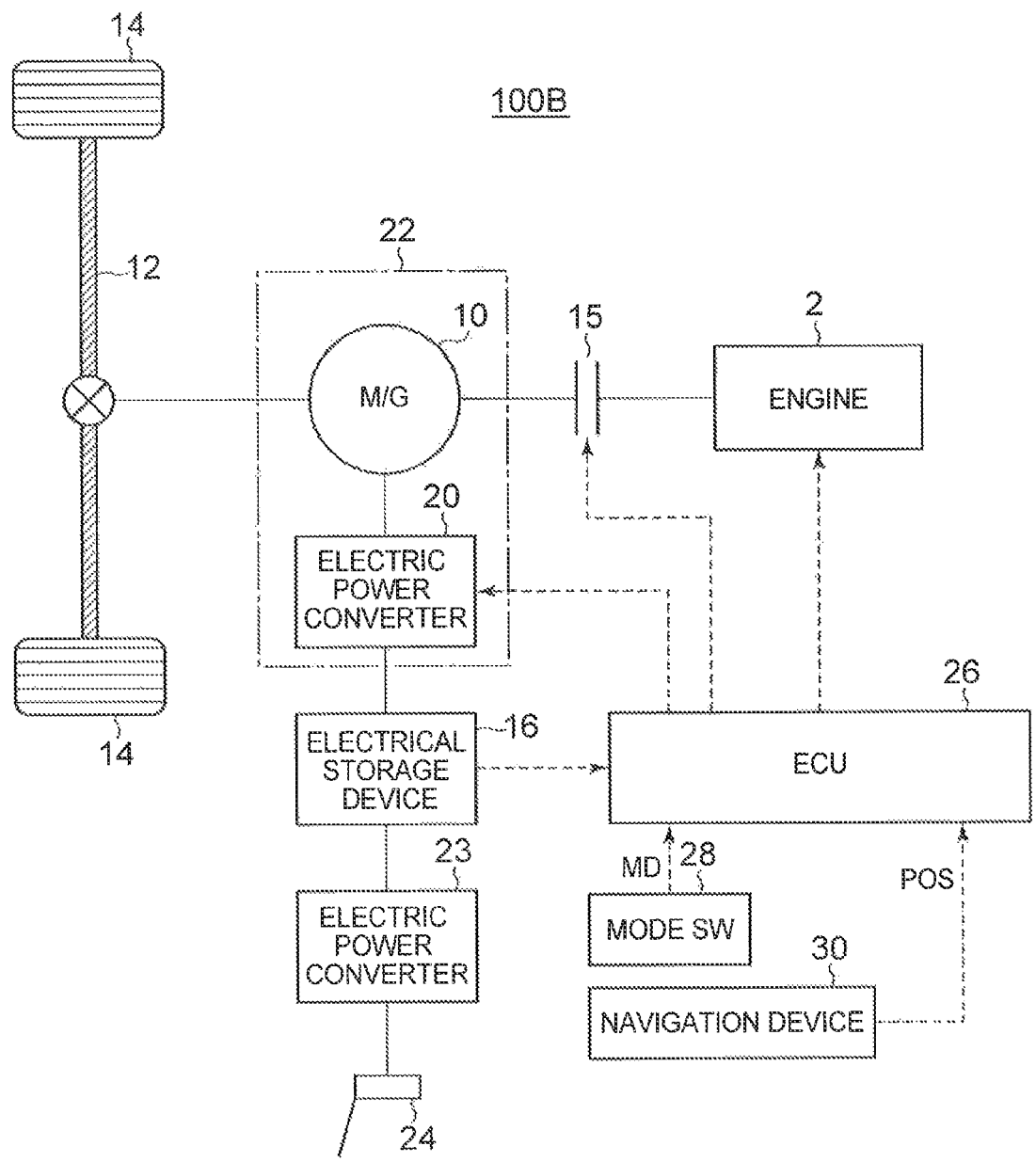
FIG. 12 is a block diagram illustrating a second modification example of the general configuration of the hybrid vehicle.

For example, as shown in FIG. 12, the control described in the aforementioned first and second embodiments is also applicable to a hybrid vehicle 100B that is configured such that the engine 2 and the single motor-generator 10 are coupled in series to each other via a clutch 15.

Besides, although not shown in particular, this disclosure is also applicable to a so-called series-type hybrid vehicle that employs the engine 2 for the sole purpose of generating electric power through the use of the motor-generator 6, and that employs only the motor-generator 10 to generate a driving force of the vehicle through the use of the electric power generated by the motor-generator 6.

Besides, in the aforementioned first and second embodiments, the hybrid vehicle 100 (100A, 100B) is a hybrid vehicle having the electrical storage device 16 that can be externally charged by the external electric power supply. However, this disclosure is also applicable to a hybrid vehicle that does not have an external charging mechanism (the electric power converter 23 and the connection portion 24). The CD mode/the CS mode are suited for externally chargeable hybrid vehicles, but are not limited thereto.

Incidentally, in the foregoing, the engine 2 corresponds to a practical example of "the internal combustion engine" in this disclosure, and the motor-generator 10 corresponds to a practical example of "the electric motor" in this disclosure. Besides, the ECU 26 corresponds to a practical example of "the control device" in this disclosure, and the electric power converter 23 and the connection portion 24 form a practical example of "the charging mechanism" in this disclosure. Furthermore, the navigation device 30 and the portable terminal 32 form a practical example of "the communication device" in this disclosure.

The disclosed embodiments should be considered to be exemplary and nonrestrictive in all respects. The scope of the disclosure is not limited by the foregoing description, and includes all modifications.

What is claimed is:
1. A hybrid vehicle comprising:
an internal combustion engine;
an electrical storage device;
an electric motor that is supplied with electric power from the electrical storage device to generate a running driving force;
a communication device that is configured to acquire host vehicle position information on the hybrid vehicle; and
at least one electronic control unit that is programmed to:
select one of a charge depleting mode and a charge sustaining mode,
cause the hybrid vehicle to run while making a changeover between a first running mode and a second running mode in accordance with a running situation of the hybrid vehicle in each of the charge depleting mode and the charge sustaining mode, the first running mode being a mode in which the hybrid vehicle runs using the electric motor with the internal combustion engine stopped, and the second running mode being a mode in which the hybrid vehicle runs with the internal combustion engine in operation,
change driving force characteristics of the hybrid vehicle such that a driving torque of the hybrid vehicle for a same vehicle speed and a same accelerator opening degree at a time when the charge depleting mode is selected becomes larger than the driving torque for the same vehicle speed and the same accelerator opening degree at a time when the charge sustaining mode is selected, and
change the driving force characteristics in accordance with a changeover in mode between the charge depleting mode and the charge sustaining mode, such that a time for a change from the driving torque before the changeover in mode to the driving torque after the changeover in mode at a time when the changeover in mode is made based on the host vehicle position information becomes longer than a time for a change from the driving torque before the changeover in mode to the driving torque after the changeover in mode at a time when the changeover in mode is made in accordance with a selection made by a user or a state of charge of the electrical storage device.

2. The hybrid vehicle according to claim 1, wherein
the electronic control unit is further programmed to decrease a limit on a speed of change in the vehicle driving torque when an amount of change in the vehicle driving torque is smaller than a predetermined value than when the amount of change is larger than the predetermined value, in changing the driving force characteristics in accordance with the changeover in mode based on the host vehicle position information.

3. The hybrid vehicle according to claim 1, further comprising:
a charging mechanism that is configured to charge the electrical storage device through use of electric power from an electric power supply outside the hybrid vehicle.

4. A hybrid vehicle comprising:
an internal combustion engine;
an electrical storage device;
an electric motor that is supplied with electric power from the electrical storage device to generate a running driving force;
a communication device that is configured to acquire host vehicle position information on the hybrid vehicle; and
at least one electronic control unit that is programmed to:
select one of a charge depleting mode and a charge sustaining mode,
cause the hybrid vehicle to run while making a changeover between a first running mode and a second running mode in accordance with a running situation of the hybrid vehicle in each of the charge depleting mode and the charge sustaining mode, the first running mode being a mode in which the hybrid vehicle runs using the electric motor with the internal combustion engine stopped, and the second running mode being a mode in which the hybrid vehicle runs with the internal combustion engine in operation, change driving force characteristics of the hybrid vehicle in accordance with a changeover in mode between the charge depleting mode and the charge sustaining mode in making the changeover in mode in accordance with a selection made by a user or a state of charge of the electrical storage device, such that a driving torque of the hybrid vehicle for a same vehicle speed and a same accelerator opening degree at a time when the charge depleting mode is selected becomes larger than the driving torque for the same vehicle speed and the same accelerator opening degree at a time when the charge sustaining mode is selected, and refrain from changing the driving force characteristics in accordance with the changeover in mode, in making the changeover in mode based on the host vehicle position information.

5. The hybrid vehicle according to claim 4, wherein
the electronic control unit is further programmed to control the driving force characteristics such that the driving force characteristics at a time when one of the charge depleting mode and the charge sustaining mode is selected based on the host vehicle position information become equivalent to the driving force characteristics at a time when the charge depleting mode is selected in accordance with the selection made by the user or the state of charge of the electrical storage device.

* * * * *